US 6,604,179 B2

(12) United States Patent
Volk et al.

(10) Patent No.: US 6,604,179 B2
(45) Date of Patent: *Aug. 5, 2003

(54) READING A FIFO IN DUAL CLOCK DOMAINS

(75) Inventors: Andrew M. Volk, Granite Bay, CA (US); Michael W. Williams, Citrus Heights, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/532,428

(22) Filed: Mar. 23, 2000

(65) Prior Publication Data

US 2002/0129196 A1 Sep. 12, 2002

(51) Int. Cl.[7] .......................... G06F 12/00; G06F 12/14; G06F 13/00; G06F 13/28; G11C 8/00
(52) U.S. Cl. ........................ 711/167; 711/154; 711/100; 365/233; 365/230.05
(58) Field of Search ................................. 711/167, 154, 711/100, 104; 365/220, 221, 230.05, 233; 710/52, 54, 57, 56, 29, 60–61

(56) References Cited

U.S. PATENT DOCUMENTS

| 4,700,391 | A | | 10/1987 | Leslie, Jr. et al. ........... 704/207 |
|---|---|---|---|---|
| 5,506,809 | A | * | 4/1996 | Csoppenszky et al. ....... 365/221 |
| 5,974,483 | A | | 10/1999 | Ray et al. ..................... 710/52 |
| 6,031,822 | A | | 2/2000 | Wallmeier ................... 370/235 |
| 6,067,120 | A | * | 5/2000 | Horikawa et al. ........... 348/447 |
| 6,216,200 | B1 | * | 4/2001 | Yeager ......................... 711/100 |
| 6,240,031 | B1 | * | 5/2001 | Mehrotra et al. ............ 365/220 |
| 6,259,650 | B1 | * | 7/2001 | Wen ............................ 365/233 |

OTHER PUBLICATIONS

Texas Instruments, FIFO Architecture, Functions and Applications, Nov. 1999, p. 13.*

* cited by examiner

Primary Examiner—Kimberly McLean-Mayo
(74) Attorney, Agent, or Firm—Blakely, Sokoloff, Taylor & Zafman LLP

(57) ABSTRACT

A first-in first-out buffer (FIFO) with multiple outputs. The FIFO has an input for writing data into the FIFO. The FIFO has multiple outputs for reading the data out of the FIFO. Each output is independent from the other outputs, and can be used to read data from a different address at a different time using a different clock signal. In one embodiment, the FIFO is implemented as a storage array with circular pointers to repeatedly loop through the addressable locations. It includes a write pointer to indicate which address represents the input. It includes multiple read pointers to indicate which addresses represent the outputs. Overrun prevention logic is used to assure that the write pointer will not cause new data to be written into any address that has not been read by all outputs, and to assure that data will not be read from any address that has not been written into.

18 Claims, 4 Drawing Sheets

READING A FIFO IN DUAL CLOCK DOMAINS

BACKGROUND OF THE INVENTION

1. Field of the Invention

The invention pertains generally to computer circuits. In particular, it pertains to a first-in first-out buffer whose output can be read by different circuits at different times using different clocks.

2. Description of the Related Art

Modem computer systems frequently have to move data between two environments using different clocks, the clocks being unrelated in speed, phase, or both. Examples would be moving data between a disk and main memory, between a memory and a processor, or between a fast bus and a slow bus. To avoid having the faster device wait on the slower device to complete the transfer, the data transfer is typically implemented by using an intervening buffer, such as a first-in-first-out buffer (FIFO), to temporarily store the data as it transitions from one environment to the other. Data can be written into the buffer using the clock from the input side of the buffer, and the data can be subsequently read from the buffer using the clock on the output side of the buffer. While this approach can allow the devices on each side to operate at their own speed, the disparity between the phase and timing of the clocks can cause inefficient operation, especially when the buffer is full and the faster device must wait until the slower device removes data and makes more buffer space available.

Processor speeds have improved so rapidly that this improvement has created a problem with getting data to the processor as fast as the processor can use it. The use of graphics processing has also created a need to transfer large amounts of data from memory in a short time. Various approaches to increase data transfer rates to/from memory have been devised, such as wider data buses and burst transmissions, which transfer a burst of data from sequential locations once the initial memory address is specified, without requiring that the addresses following the initial address be specified.

In connection with burst mode transfers, the command lines and data lines are sometimes separated into two different buses, so that the next command sequence can be initiated before the current data transfer is complete. In fact, it is possible for multiple commands to be completely issued on the bus before the data starts returning from the first command. In addition, the command sequence can require that different pieces of related command data be sent out at different times. A conventional approach to resolve this issue is to place both pieces of command data in the same serial buffer, with a predetermined number of no-op commands between them to implement a delay between them. This takes up space in the buffer that could be used for actual command data, thus reducing the effective size of the buffer. An alternative conventional approach is to handle the timing functions entirely with logic external to the queue. If the timing relationships are dynamically alterable or otherwise complicated, determining and implementing the correct timing relationships can require that logic to be very complex.

Since multiple devices can potentially request a memory transfer at approximately the same time, these various requests can be scheduled and queued up so the requesting devices can be released to perform other functions while waiting for their data transfer to commence and complete. This queue creates one of the aforementioned buffers between environments with different clock speeds. The scheduling of requests also creates an unpredictable time delay between the time the requesting device makes its request and the time the requested data is presented to the requesting device.

When data is being read back after a memory read request, a read data queue can be used to buffer the incoming data as it transitions from the memory side (requested device side) time domain and the host side (requesting device side) time domain. Since the original scheduling of the request causes an unknown delay before the data is actually ready in the buffer, the requesting device will most likely be occupied with some other task when the data is ready to be transferred from the buffer to the requesting device. For efficient operation, the requesting device may therefore need some advance warning that data is available so that it can prepare its own storage circuits to receive that data. Waiting until the data appears at the output of the read data queue does not provide that warning. Alternately, trying to predict when the data will be available by catching the data before it enters the read data queue involves logic using the wrong time domain. Finally, the delay time required for the data to proceed through the read data queue can be unpredictable because the queue may simultaneously contain data for multiple devices, each with its own individual setup time and transfer characteristics.

SUMMARY OF THE INVENTION

An embodiment of the invention includes a storage array containing multiple addressable storage locations, a write pointer coupled to the storage array to point to one of the storage locations as an input address, and two read pointers coupled to the storage array to point to two storage locations as output addresses. The invention also includes a first clock coupled to the storage array to clock write data into the storage array at the input address. It further includes second and third clocks coupled to the storage array to clock read data from the storage array at the two output addresses.

DETAILED DESCRIPTION OF THE INVENTION

Figure 1:
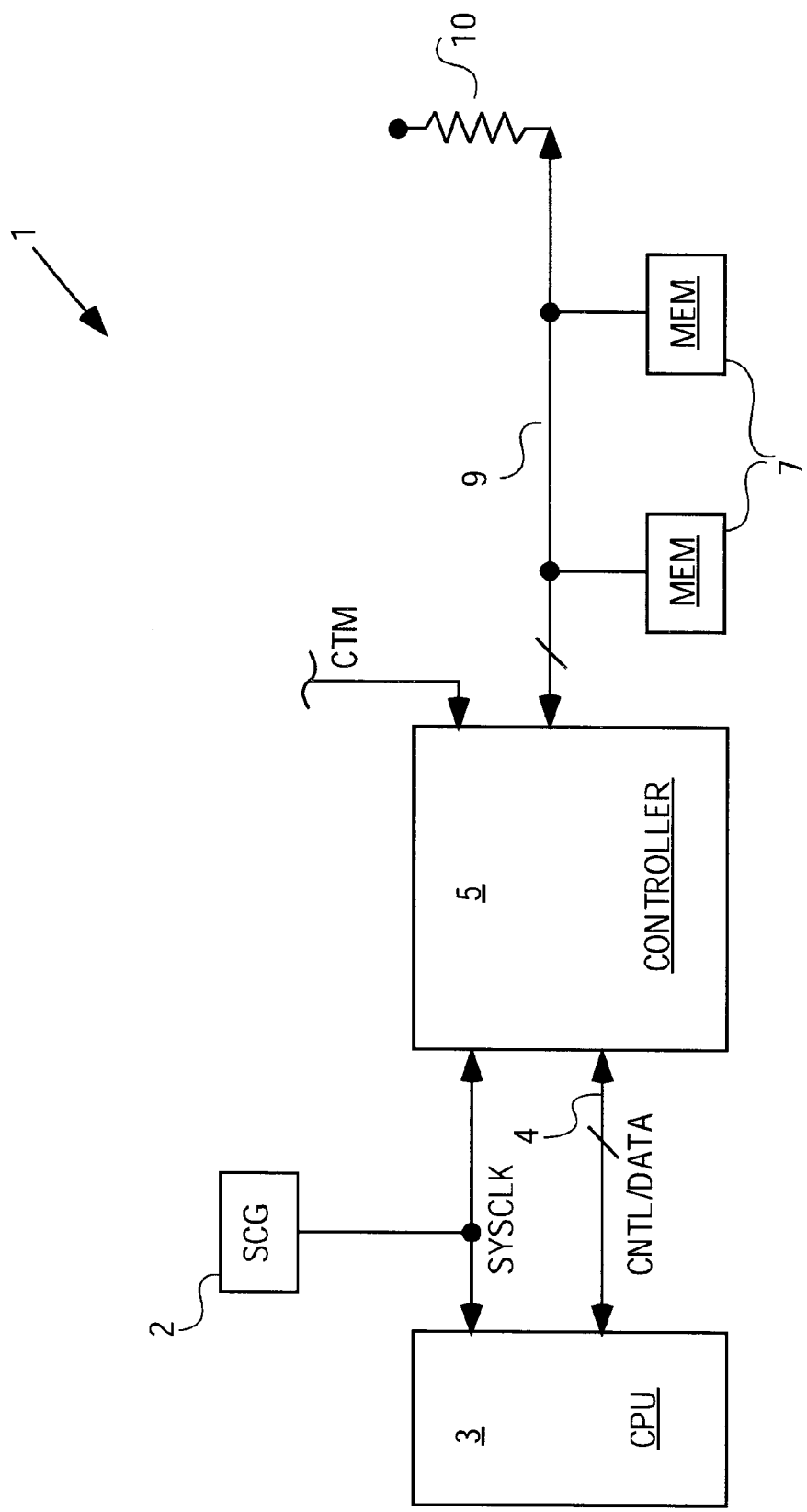
FIG. 1 shows a block diagram of an RDRAM system.

By way of illustration, FIG. 1 shows a block diagram of a system 1 including a Rambus™ dynamic random access memory (RDRAM) controller 5. Memory controller 5 includes interface logic for passing control and data signals between CPU 3 and one or more memory devices (MEM) 7 on memory bus 9. On the host (CPU) side of controller 5, the system clock SYSCLK is provided by system clock generator (SCG) 2, which provides SYSCLK to both CPU 3 and the host side of controller 5. SYSCLK, or derivatives thereof, are used to clock the control and data signals on bus 4, and to clock the interface logic to bus 4 within controller 5. On the memory side of controller 5, the clock-to-master (CTM) clock signal, or derivatives thereof, are used to clock the control and data signals on memory bus 9, and to clock the interface logic to bus 9 within controller 5. A single terminator resistor 10 is conceptually shown at the end of bus 9. In reality, each separate line in bus 9 would have its own terminator resistor to maintain proper impedance and reflectivity characteristics for that line. SYSCLK and CTM represent the two clock signals for the two clock domains on the host and memory sides of the controller, respectively. SYSCLK and CTM will typically have different frequencies, and may have independent sources.

Figure 2:
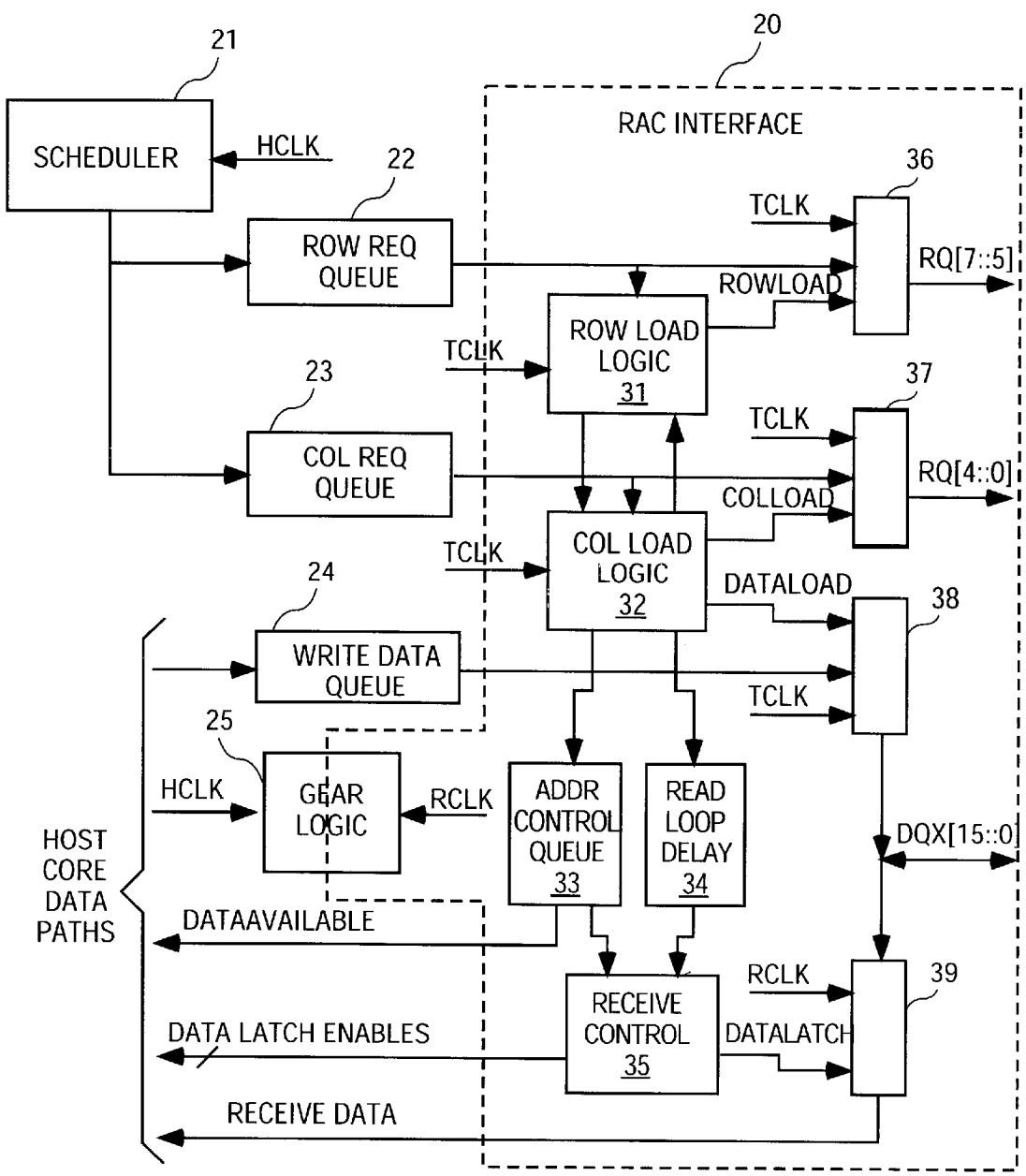
FIG. 2 shows a block diagram of memory controller including the invention.

FIG. 2 shows a more detailed view of some of the internal components of controller 5. RDRAM ASIC Controller (RAC) 20 can be a subcomponent of controller 5 and contains interface logic from controller 5 to memory bus 9. Bus 9 is actually composed of two relatively independent buses—a control bus and a data bus. In the embodiment shown, the control bus includes eight unidirectional request lines RQ7-RQ0, while the data bus includes sixteen bi-directional data lines DQ15-DQ0. The illustrated embodiment of RAC 20 operates in burst mode. Each time a memory transfer address is set up by a command sequence, the contents of a predetermined number of sequential memory addresses are transferred, beginning with the memory address specified in the command. For example, a command sequence would begin by placing a specified row number on command lines RQ7-5. This causes the specified row (block) of memory to be opened. The block might be a page of memory, or some other size block. Once the row is opened, a specified column number is placed on command lines RQ4-0. This causes the specified column (sub-block) within the opened block to be selected. One of the column bits can be used to specify a read or a write. The column command also initiates the transfer of data from the specified sub-block. The terms "row" and "column" are frequently used in describing this memory selection process because the memory devices are conceptually (and sometimes physically) laid out internally in a row/column format. However, this particular layout is not a requirement for the practice of the invention.

The addressable memory space may be much larger than the number of blocks and sub-blocks addressable by request lines RQ7-RQ0. Other logic (not shown) can be used to pre-select a portion of memory before issuing the row and column commands to that portion. Alternately, a larger number of request bits can be used to expand the memory range addressable by RAC 20.

Once a transfer is initiated by the column command, the selected memory device begins transferring data over data lines DQ15-0, either from memory for a read command, or to memory for a write command. The number of bytes that are transferred in parallel at the same time depends on the width of the data bus. In this example, with a data bus width of sixteen data lines (DQ15-0), it would be two bytes at a time over the sixteen data lines. The number of sequential transfers to be made in response to the single column command can be predetermined. The system might be set up to consistently transfer the same number of bytes each time, or the number of bytes to transfer might be specified during the command sequence, using command lines or other signal lines not shown.

Once a transfer has been initiated by a column command, another transfer can be initiated by a subsequent column command. As long as this data is located within the same row (block), there is no need to issue another row command because the selected memory block is already open. If another block is to be chosen, then another row command must be issued before the column command so that the memory transfer will be from the proper memory block.

RDRAM memories are designed to transfer data at high data rates, and minimizing overall transfer time is important. For this reason, the command bus is typically decoupled from the data bus so that the command bus can be setting up one or more subsequent data transfers before the data bus has completed (or even begun) a data transfer from a previous command.

As previously stated, RAC 20 operates between two different time domains. On the host side, host clock HCLK is used for timing and data transfers. HCLK is typically derived from SYSCLK, which is the controlling clock signal for host-side timing. On the memory side, read clock (RCLK) and transmit clock (TCLK) are used for timing and data transfers over memory bus 9. RCLK and TCLK are derived from clock signal CTM, which is the controlling clock signal for memory-side timing. To assure proper timing relationships between the various signals, RCLK can be a slightly delayed version of CTM, while TCLK can be advanced 90 or more degrees from RCLK. TCLK is used to clock row requests, column requests, and write data from interface logic circuits 36, 37 and 38, respectively, onto memory bus 9. RCLK is used to clock read data from memory bus 9 into interface logic 39. CTM feeds directly through controller 5 to one of the lines in bus 9 as a Clock-from-Master (CFM) clock signal (not shown). CFM is used to time data and command write transfers on bus 9, while CTM is used to time data read transfers.

Although the host-side and memory-side clocks have different frequencies and can be derived from independent sources, the efficiency of the transfer from one time domain to the other is improved if the two clocks can be synchronized. This function can be performed by gear logic 25. The frequencies of HCLK and RCLK are chosen so that the ratio of the two frequencies is a ratio of two small integers x and y. For example, if HCLK is 133 megahertz (MHz) and RCLK is 400 MHz, the ratio of x/y would be 1/3. Within this constraint, gear logic 25 can adjust the phase of one of the clocks so that the clocks are synchronized every x/y cycles. Using the 1/3 ratio as an example, on every cycle of HCLK and every third cycle of RCLK, the rising edges of HCLK and RCLK would coincide. This can improve the efficiency of the inter-domain transfer logic because data or command bits provided from one time domain do not have to be held for an unpredictable random time period before being latched in the other domain.

Memory requests can be initiated from the host side of controller 5 not only by CPU 3, but by other devices (not shown) capable of accessing memory. Since multiple devices might try to access memory devices 7 at approximately the same time, scheduler 21 can be employed to receive, prioritize, schedule and issue these requests in an orderly, controlled manner. In FIG. 2, scheduler 21 is shown scheduling the command sequence by feeding the row and column commands into row request queue 22 and column request queue 23. Write data for the write data queue 24 is shown being provided by the requesting device. However, in other embodiments, scheduler 21 could also schedule the write data into write data queue 24. Queues 22, 23 and 24 can be functionally implemented as first-in first-out buffers (FIFO's). A FIFO can be physically implemented as a series of cascading registers in which the data is physically shifted in parallel from the input register and through the intermediate registers to the output register. A FIFO can also be implemented as a small storage device with a series of sequentially addressable memory locations, in which the contents remain in the same locations, but address pointers are used to shift the input and output locations from one address to the next. The implementation of FIFO's is well known in the art and is not further described herein.

As shown in FIG. 2, separate queues are used for the Row Request commands, Column Request commands, and Write Data commands. Due to the nature of the RDRAM memory bus operation, each queue may contain significantly different amounts of information associated with the same memory request. Row request queue 22 might contain a single request to open a row, while column request queue 23 might contain one or several column requests for accessing different areas of the row once it has been opened. Write data queue 24 can contain several data entries for each column request involving a memory write, or no data for a column request involving a memory read. The relationship between the number of entries in the row, column, and write data queues is entirely unpredictable, so some sort of mechanism must be used to keep the associated row, column, and write data entries tied together.

In addition, various timing relationships may need to be maintained between the various commands. When a row request command is issued from interface logic 36 onto memory bus 9, the selected memory device 7 requires a minimum setup time to open the designated row before it can accept the first column request command. However, for any subsequent column request commands within that row, the row has already been opened and the setup time is either not required or is greatly reduced. By the same token, once a column command has been issued to initiate a memory write, a certain setup time may be required before placing the first piece of data on memory bus 9, but the immediately following data may not require that setup time. Providing for worst-case delays in every instance would significantly degrade the throughput over the memory bus, but using external logic to determine which delays are needed, and when, could require significant amounts of circuitry and complexity.

The memory controller of the invention avoids these difficulties by placing the relevant timing information into the queue along with the related command/data information. Once a memory request has been issued to a memory device 7 over memory bus 9, a data transfer ensues between the addressed memory device and the requesting device. In the case of a write request, data is place into write data queue 24 by the requesting device and subsequently transferred to the addressed memory device. In the case of a read request, data from the addressed memory device goes through interface logic 39 on its way to the requesting device. To route this data in a controlled manner, receive control logic 35 provides a data latch signal to latch the data into interface logic 39, and also provides a separate data latch signal to latch data into the requesting device's buffer (not shown). In one embodiment, receive control logic 35 is a state machine.

In order for this process to work efficiently with maximum throughput, additional timing coordination is needed. Once column load logic 32 initiates a read request, a predetermined amount of time will elapse before the read data is available to interface logic 39. Read loop delay 34 provides this delay time before informing receive control logic 35 that new data is arriving. During this delay time, receive control logic 35 can be completing a previous read data transfer.

Once receive control logic 35 is informed that new data is to be transferred, address control queue 33 can provide address and timing signals to receive control logic 35 for maximizing the throughput of read data. There are two parts to this control. Address control queue 33 provides an early-warning DataAvailable signal to the requesting device (the device that originally requested data from memory), informing the requesting device that the requested data is about to become available. This advance warning allows the requesting device some time to open a buffer, initialize its own receiving logic, or perform some other type of setup function. This advance warning is also clocked by the host-side clock HCLK, as is most of the data transfer logic on the host side of RAC 20. Address control queue 33 then sends a signal to receive control logic 35, enabling it to latch the incoming data in interface logic 39, so that the data is available to the requesting device on the ReceiveData lines. This signal is clocked by RCLK, or one of the related clocks on the memory side of RAC 20 that are derived from CTM. The DataAvailable signal and the signal to Receive Control logic 35 may contain the same information, i.e., the destination address of the byte, word, or other unit of data being transferred. But they are presented at different times and are clocked by different sources in different time domains.

Address Control Queue 33 can be a FIFO buffer. In a standard FIFO, once data is clocked out of the output, that data is lost from the FIFO as the following data appears at the same output. In queue 33, the same data must be clocked out of the FIFO at two different times, using two unrelated clocks, without allowing the first clock to purge the data before the second clock has latched it. This is true even if subsequent data is to be read by the first clock before the second clock reads the first data. Therefore, FIFO 33 needs to have multiple, time-independent outputs, even though the same data is to be read from each output.

Figure 3:
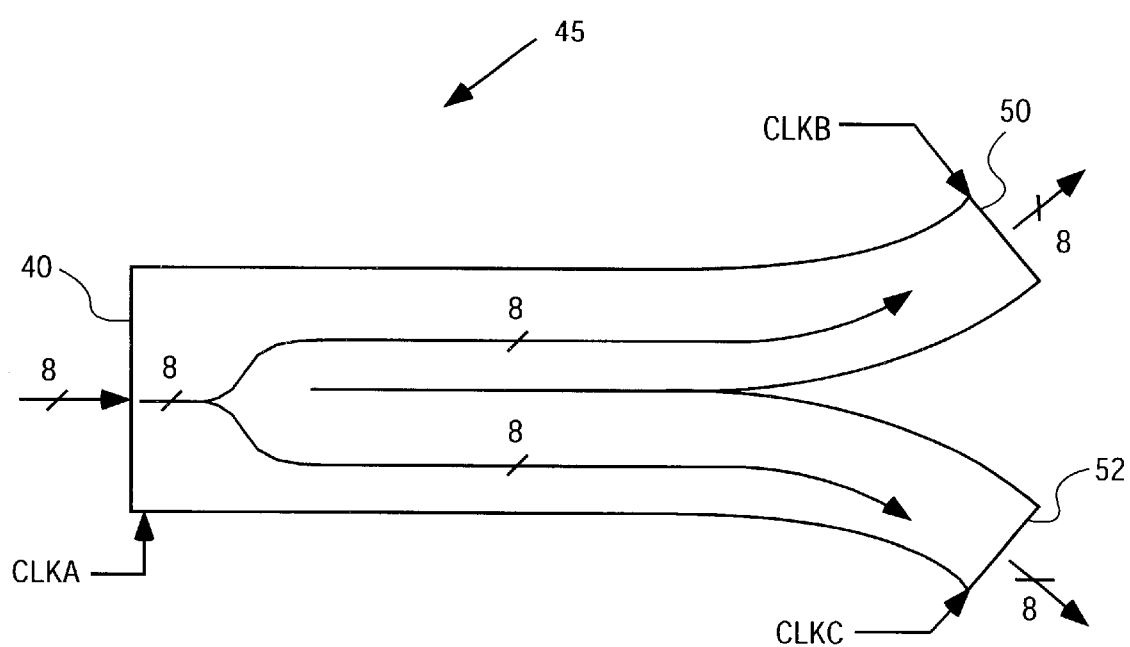
FIG. 3 shows a conceptual depiction of a FIFO of the invention.

FIG. 3 shows a conceptual depiction of a generic FIFO 45 with redundant but independent dual outputs. FIFO 45 is shown with input 40 for receiving an 8-bit byte of data. Other data widths can also be used—a byte has been chosen simply for illustrative purposes. A first clock signal CLKA can be used to clock data into input 40, one byte at a time. Once it is clocked into input 40, each data byte travels through FIFO 45 to outputs 50 and 52, each output capable of providing that same byte of data to any subsequent circuitry. Between input 40 and outputs 50, 52 are multiple stages (not shown) for holding the data bytes as they travel from input to output. The number of such stages is a design choice to be made based on the requirements of the particular application. Data is clocked out of output 50 with a second clock signal CLKB, causing the next byte of data to appear at output 50. In a similar manner, data is clocked out of output 52 with a third clock signal CLKC, causing the next byte of data to appear at output 52. Since clocks CLKB and CLKC are independent of each other, outputs 50 and 52 may present the same byte at different times, or present different bytes at the same time. One way to implement this circuit is to provide two independent queues that share (or duplicate) a common input stage. Each queue would have its own buffer-full logic to prevent further writing of data to input 40 when all stages in that queue are occupied. Each queue would also have its own buffer-empty logic to prevent further reading of data from that output when all stages in that queue are empty. However, this approach requires twice the circuitry, since most of the queue is duplicated.

Figure 4:
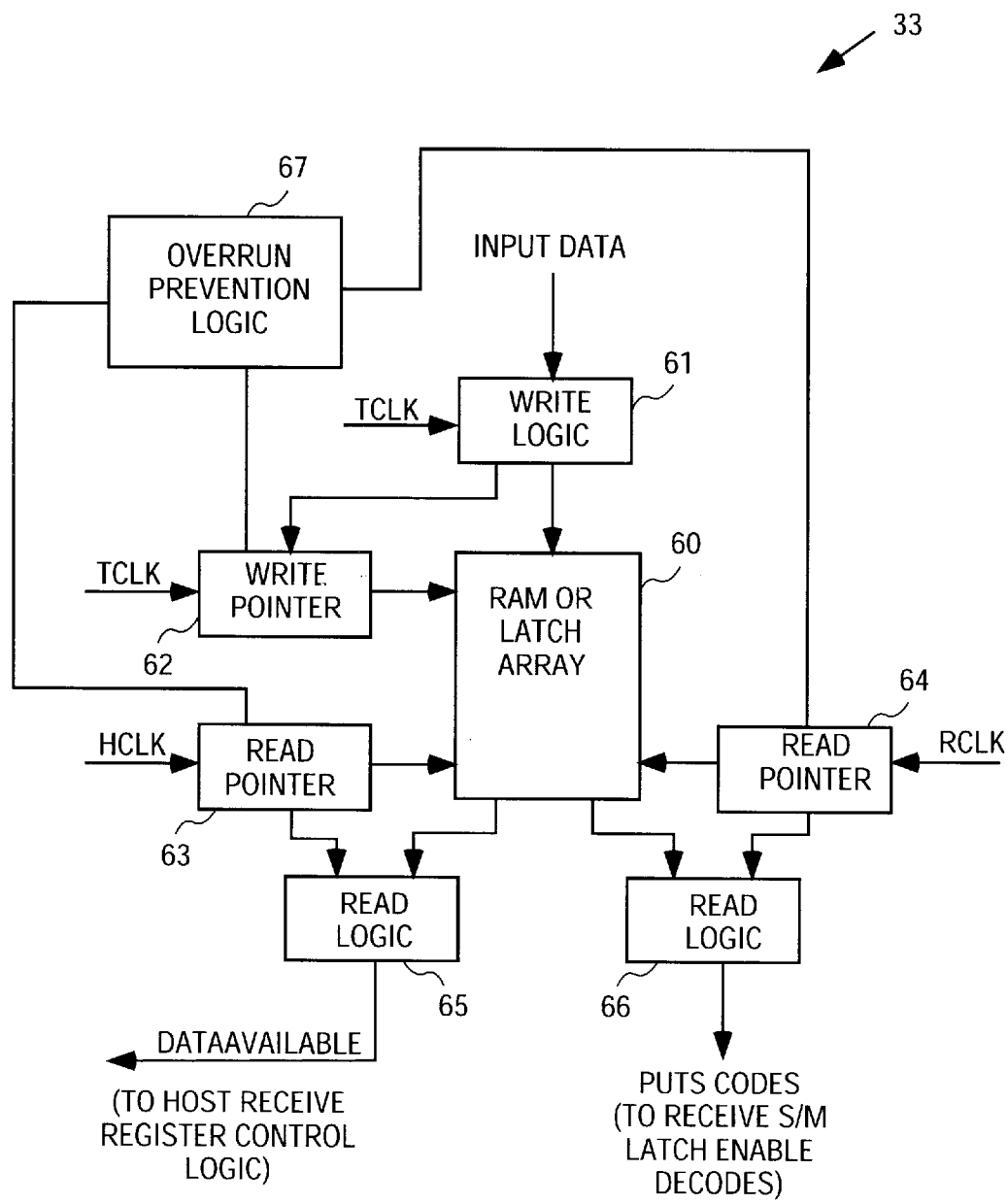
FIG. 4 shows a multi-output read data FIFO of the invention.

An improved embodiment is shown in FIG. 4. Address control queue 33 can be implemented as a data array 60 with pointers. Data array 60 can be a RAM memory, an array of latches, or other form of storage involving a quantity of sequentially addressable read/write locations. In one embodiment, write pointer 62 can be a counter whose contents specify an address within array 60 at which data will be written into array 60. Write logic 61 can capture input data by using the leading edge of clock signal TCLK to latch the input data and hold it for writing into input array 60 at the address specified by write pointer 62. The trailing edge of TCLK can be used to perform the actual write operation.

The next leading edge of TCLK can then latch new data into write logic 61 and increment write pointer 62 so that it points to the next address within array 60. Other timing conventions can also be used. In this manner, the input of the FIFO implemented by array 60 is sequentially moved through the array, while the contents physically remain in the same locations. Write pointer 62 is a circular pointer, meaning that once it reaches the maximum address contained in array 60, the next increment will reset the counter to the minimum address contained in array 60, turning the linear array into the equivalent of a circular array. For this reason, FIFOs implemented with arrays and pointers usually have a number of locations equal to a power of 2, so that the counter will automatically increment to zero when it reaches its maximum value.

In a similar manner, an output of the array is specified by read pointer 63, a counter whose contents point to an address from which data will be read out of array 60. This data is read into read logic 65, from where it is available to the requesting device over a bus or other circuit. Once the data is read, the next clock signal HCLK increments read pointer 63 to the next location, which becomes the next output location. In this manner, the output point of array 60 cycles through each of its addresses, while the data within the array does not physically move. Like write pointer 62, read pointer 63 is also a circular pointer.

Write pointer 62 and read pointer 63 are basically independent of one another, are driven by different clocks, and respond to different demands from the surrounding circuitry. Thus, data can be read from array 60 at a faster or slower rate than it is written into array 60. However, this independence is limited by practical considerations. As with any FIFO, data cannot feasibly be written into a full buffer, i.e., one in which all locations contain unread data. In a FIFO implemented with an array and pointers, logic can be employed to prevent the write pointer from exceeding the read pointer. If this occurred, old data would be overwritten by new data before the old data had been read out. By the same token, data cannot be read from an empty buffer, i.e., one in which all data has been read out and into which no additional data has been written. In a FIFO implemented with an array and pointers, logic can be employed to prevent the read pointer from exceeding the write pointer. If this occurred, data would be read from a location before it was written into that location, so the data being read would be left over from a previous operation and would be incorrect. Overrun prevention logic 67 prevents either of these conditions from occurring by preventing writes that would cause the write pointer to overrun the read pointer, and by preventing reads that would cause the read pointer to overrun the write pointer. Overrun prevention logic 67 can also provide a status output to indicate the full/empty status of array 60 to other logic.

Queue 33 also has a second read pointer 64, a counter whose contents point to a second address from which data will be read out of array 60. This data is read into read logic 66, from where it is available to the requesting device over a bus or other circuit. Once the data is read, the next clock signal RCLK increments read pointer 64 to the next location, which becomes the next output location for this second output. In this manner, the second output point of array 60 cycles through each of its addresses, while the data within the array does not physically move. Like write pointer 62 and read pointer 63, read pointer 64 is also a circular pointer. As before, overrun prevention logic 67 must prevent write pointer 62 from overrunning read pointer 64, and must prevent read pointer 64 from overrunning write pointer 62.

However, overrun prevention logic 67 is somewhat more complicated with two outputs to deal with. It must prevent another write operation if the write pointer would overrun either read pointer. But if one of the read pointers is about to overrun the write pointer, it need only prevent a read from the output associated with that read pointer, not from both outputs. In one embodiment, the FIFO becomes either empty or full when the read and write pointers are equal. If the pointers become equal because of a read, then the FIFO is empty. Likewise, if the pointers become equal because of write, the FIFO is full. This can be implemented by providing a comparator for each read pointer that compares it to the write pointer. If the ordering of the reads is consistent (one output is always read before the other), this logic can be simplified by eliminating one of the comparators.

Queue 33 can be a common storage array with a unified addressing scheme for all the pointers, i.e., the same location in queue 33 will be selected by the same address in each of write pointer 62, read pointer 63, and read pointer 64.

Queue 33 is shown with two outputs and associated pointers. More outputs could just as well be incorporated by adding more read pointers, and expanding the overrun prevention logic to accommodate them.

Implementing the aforementioned design in the address control queue 33 of FIG. 4 permits address control queue 33 to provide the same information to both receive control logic 35 and the requesting device at different times, under the control of different clocks. In this application, the "data" that is written into and read out of array 60 is actually comprised of the destination addresses for the data being read from memory device 7. The destination addresses are the bus addresses on the host side of RAC 20 to which the data from memory device 7 are being written. These can be internal addresses for registers, register arrays or chip interfaces. Other associated data may also be included in array 60.

The memory controller of FIG. 2 schedules and initiates data transfers that are requested from multiple devices, each with an assigned address. Once a device makes a read request to the memory controller for a quantity of data from memory, that device must wait for an indeterminate period of time before the data will actually be available to it. During this time, the requesting device will most likely be occupied with other tasks, and must be notified when the data is finally available. To prevent unnecessary delays, the requesting device should be given some advance notice that the requested data is about to become available and the destination address for the data should be specified. This allows the requesting device time to make its associated input buffer available, or otherwise prepare itself to receive the data as soon as the data is presented. These functions are controlled by host-side clock HCLK. By the same token, receive control logic 35 must be made aware of the destination address so that it can provide the data latch signals to latch data from memory into interface logic 39. These functions are provided by memory-side clock RCLK. To queue up this destination data, the destination addresses for the requested data from memory can be written into address control queue 33 when the data is initially requested from memory by RAC 20. After other, previously written destination addresses have passed through array 60, the first destination address of the designated request will appear at the first output, as indicated by read pointer 63. This address can then be clocked out of the array by HCLK and passed on to the requesting device, where it is used to set up the device to receive the requested data. At a later time, the same destination address of the designated request will be clocked out of the second output, as indicated by read pointer 64. This address can then be clocked out of the array by RCLK and used by receive control logic 35 to latch the requested data and make it available to the requesting device. Thus, queue 33 can deliver the same information to two different circuits at two different times, under the control of two different clocks, without having to use two different queues. The two outputs can be out of step by several locations without impairing the ability of the queue to deliver the correct information.

The invention can be implemented in circuitry or as a method. The invention can also be implemented as instructions stored on a machine-readable medium, which can be read and executed by at least one processor to perform the functions described herein. A machine-readable medium includes any mechanism for storing or transmitting information in a form readable by a machine (e.g., a computer). For example, a machine-readable medium can include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. For example, the counters used as address pointers could decrement instead of increment. The queue might have more than two outputs. The same clock might be used for more than one pointer. These and other variations will occur to those of skill in the art. Those variations are intended to be included in the invention, which is limited only by the spirit and scope of the appended claims.

We claim:

1. An apparatus, comprising:
   a first-in-first-out buffer containing a plurality of addressable storage locations;
   a write pointer coupled to the first-in-first-out buffer to point to a first one of the addressable storage locations as an input location;
   a first read pointer coupled to the first-in-first-out buffer to point to a second one of the addressable storage locations as a first output location;
   a second read pointer coupled to the first-in-first-out buffer to point to a third one of the addressable storage locations as a second output location;
   a first clock coupled to the first-in-first-out buffer to clock a destination address for a memory data request into the first-in-first-out buffer at the input location;
   a second clock coupled to the first-in-first-out buffer to clock the destination address from the first-in-first-out buffer at the first output location; and
   a third clock coupled to the first-in-first-out buffer to clock the destination address from the first-in-first-out buffer at the second output location;
   wherein the first output location is to provide advance notice that data requested from a memory device is to be available and the second output location is to subsequently provide notice that the data requested from the memory device is available.

2. The apparatus of claim 1, wherein:
   the first clock is coupled to the write pointer to increment the write pointer;
   the second clock is coupled to the first read pointer to increment the first read pointer; and
   the third clock is coupled to the second read pointer to increment the second read pointer.

3. The apparatus of claim 1, wherein each of said write pointer, first read pointer, and second read pointer is a circular pointer.

4. The apparatus of claim 1, wherein each of said first, second and third clocks are different clocks from one another.

5. The apparatus of claim 1, further comprising overrun prevention logic coupled to the write pointer and to the first and second read pointers to prevent the write pointer from incrementing past the first read pointer and to prevent the write pointer from incrementing past the second read pointer.

6. The apparatus of claim 5, wherein the overrun prevention logic includes a status output to indicate a full/empty status of the first-in-first-out buffer.

7. The apparatus of claim 1, further comprising write logic coupled to the write pointer and the first-in-first-out buffer to write the destination address into the storage array at the input location indicated by the write pointer.

8. The apparatus of claim 1, wherein the first-in-first-out buffer has a unified addressing scheme for the write pointer and the first and second read pointers.

9. The apparatus of claim 1, further comprising:
   first read logic coupled to the first read pointer and the first-in-first-out buffer to read the destination address from the first-in-first-out buffer at the first output location indicated by the first read pointer; and
   second read logic coupled to the second read pointer and the first-in-first-out buffer to read the destination adress from the first-in-first-out buffer at the second output location indicated by the second read pointer.

10. A computer memory controller, comprising:
    an interface to a memory bus;
    read request logic coupled to the interface to request data from a memory device;
    receive logic coupled to the interface and the memory device to receive the data from the memory device and provide the data to a destination address through the interface;
    a destination address queue to indicate the destination address for the data received from the memory device, the destination address queue including
    a first-in-first-out buffer containing a plurality of addressable storage locations;
    a write pointer coupled to the first-in-first-out buffer to point to a first one of the addressable storage locations as an input storage location for the destination address;
    a first read pointer coupled to the first-in-first-out buffer to point to a second one of the addressable storage locations as a first output storage location for the destination address;
    a second read pointer coupled to the first-in-first-out buffer to point to a third one of the addressable storage locations as a second output storage location for the destination address;
    a first clock coupled to the first-in-first-out buffer to clock the destination address into the first-in-first-out buffer at the input storage location;
    a second clock coupled to the first-in-first-out buffer to clock the destination address from the first-in-first-out buffer at the first output storage location; and
    a third clock coupled to the first-in-first-out buffer to clock the destination address from the first-in-first-out buffer at the second output storage location;
    wherein the first output storage location is to provide advance notice that the data requested from the memory device is to be available and the second output storage location is to subsequently provide notice that the data requested from the memory device is available.

11. The controller of claim 10 wherein:
the first clock is coupled to the write pointer to increment the write pointer;
the second clock is coupled to the first read pointer to increment the first read pointer; and
the third clock is coupled to the second read pointer to increment the second read pointer.

12. The controller of claim 10, wherein each of said write pointer, first read pointer, and second read pointer is a circular pointer.

13. The controller of claim 10, wherein each of said first, second and third clocks are different clocks from one another.

14. The controller of claim 10, further comprising overrun prevention logic coupled to the write pointer and to the first and second read pointers to prevent the write pointer from incrementing past the first read pointer and to prevent the write pointer from incrementing past the second read pointer.

15. The controller of claim 14, wherein the overrun prevention logic includes a status output to indicate a full/empty status of the first-in-first-out buffer.

16. The controller of claim 10, further comprising write logic coupled to the write pointer and the first-in-first-out buffer to write the destination address into the first-in-first-out buffer at the input storage location indicated by the write pointer.

17. The controller of claim 10, wherein the first-in-first-out buffer has a unified addressing scheme for the write pointer and the first and second read pointers.

18. The controller of claim 10, further comprising:

first read logic coupled to the first read pointer and the first-in-first-out buffer to read the destination address from the first-in-first-out buffer at the first output storage location indicated by the first read pointer; and second read logic coupled to the second read pointer and the first-in-first-out buffer to read the destination address from the first-in-first-out buffer at the second output storage location indicated by the second read pointer.

* * * * *

UNITED STATES PATENT AND TRADEMARK OFFICE
CERTIFICATE OF CORRECTION

PATENT NO.   : 6,604,179 B2  Page 1 of 1
DATED        : August 5, 2003
INVENTOR(S)  : Volk et al.

It is certified that error appears in the above-identified patent and that said Letters Patent is hereby corrected as shown below:

<u>Column 1,</u>
Line 12, delete "Modem" and insert -- Modern --.

Signed and Sealed this

Second Day of December, 2003

JAMES E. ROGAN
*Director of the United States Patent and Trademark Office*